United States Patent
Yamazaki et al.

(10) Patent No.: US 6,864,603 B2
(45) Date of Patent: Mar. 8, 2005

(54) ALTERNATOR FOR VEHICLE

(75) Inventors: Shinji Yamazaki, Hitachinaka (JP);
Wasei Horioka, Hitachinaka (JP);
Masami Takano, Hitachinaka (JP);
Susumu Tajima, Hitachinaka (JP);
Susumu Terumoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 10/337,842

(22) Filed: Jan. 8, 2003

(65) Prior Publication Data
US 2003/0127920 A1 Jul. 10, 2003

(30) Foreign Application Priority Data
Jan. 8, 2002 (JP) .......................................... 2002-1287

(51) Int. Cl.$^7$ ............................. H02K 9/00; H02K 9/20
(52) U.S. Cl. ............................. 310/53; 310/52; 310/54; 310/64
(58) Field of Search .............................. 310/54, 52, 53, 310/64, 68 C, 68 D

(56) References Cited

U.S. PATENT DOCUMENTS

| | | | | |
|---|---|---|---|---|
| 4,221,982 A | * | 9/1980 | Raver et al. | 310/59 |
| 4,980,588 A | * | 12/1990 | Ogawa | 310/68 D |
| 5,798,586 A | * | 8/1998 | Adachi | 310/54 |
| 6,157,105 A | * | 12/2000 | Kuragaki et al. | 310/75 R |
| 6,184,602 B1 | * | 2/2001 | Ooiwa et al. | 310/68 D |
| 6,285,100 B1 | * | 9/2001 | Pflueger et al. | 310/68 D |
| 6,528,912 B2 | * | 3/2003 | Asao | 310/68 D |

FOREIGN PATENT DOCUMENTS

| | | | |
|---|---|---|---|
| EP | 1041699 | * 3/2000 | ............ H02K/5/20 |
| EP | 1041699 | 10/2000 | |
| EP | 1096647 | 5/2001 | |
| JP | 07-194060 | 7/1995 | |
| JP | 2000-245111 | 9/2000 | |

* cited by examiner

*Primary Examiner*—Burton S. Mullins
*Assistant Examiner*—Heba Elkassabgi
(74) *Attorney, Agent, or Firm*—Crowell & Moring LLP

(57) ABSTRACT

An automotive alternator comprises: a stator provided with a stator coil; a rotor supported for rotation in the stator to apply an alternative magnetic field to the stator; a regulator for regulating output; a rectifier for rectifying generated current; a plurality of housings holding the stator and the rotor; and a coolant path through which a coolant flows through at least one of the plurality of housings to transfer heat generated in the stator coil outside the automotive alternator. Fastening devices formed of a material having good heat conductance fasten the regulator and a heatsink for the regulator together to the housing at a position apart from the housing to transfer heat generated by the regulator to the housing. Thus, the automotive alternator can maintain a stable cooling ability in a hot atmosphere for a long time.

12 Claims, 12 Drawing Sheets

ALTERNATOR FOR VEHICLE

BACKGROUND OF THE INVENTION

The present invention relates to an alternator for a vehicle and more particularly, to a liquid-cooled alternator for a vehicle.

Most conventional automotive alternators are of an air-cooled type that dissipates heat generated therein into the atmosphere. Recently, the temperatures of parts arranged in an engine room have increased, and the temperature of air in the engine room has increased. Consequently, when the ambient air temperature rises, air-cooling cannot efficiently dissipate the heat generated by the alternator in some automobiles.

Although the heat generating ability of a regulator for regulating an automotive alternator is not high, it is important to cool the regulator efficiently because the absolute heat resistance of the regulator, as compared with that of stator coils, is not high.

Recently, automobiles are required to arrange parts in the engine room in a high density, to improve the efficiency of the engine and to reduce emissions for low noise and improvement of output and efficiency. Consequently, there is a tendency that the temperature in the engine room increases and radiant heat increases due to temperature rises in the parts disposed in the engine room. Therefore, an automotive alternator disposed in the engine room is exposed to a high-temperature atmosphere for a long time, which causes the deterioration of the performance and the shortening of the life of the automotive alternator.

A method of protecting the automotive alternator from heat damage disposes a heat shield plate formed of a material having low heat conductance between the automotive alternator and hot parts arranged in the engine room. However, the effect of this method in protecting the automotive alternator from heat damage is not satisfactory because air temperature in the engine room rises inevitably when the engine is operated continuously for a long time.

Liquid-cooled automotive alternators disclosed in JP 7-194060A and JP 2000-245111A are intended for use in a hot atmosphere.

Alternators disclosed in JP 7-194060A, EP 1041699A2 and EP 1096647A2 dissipate heat generated by a voltage regulator and a rectifier through a heatsink and a rear housing to cool the alternators. The alternator disclosed in JP 2000-245111A dissipates heat generated by a voltage regulator and rectifier through a heat-radiating plate, a rear bracket on a side opposite to the side of a pulley, a member having good heat conductance and a liquid-cooled housing to cool the alternator.

In the alternator disclosed in JP 7-194060A and JP 2000-245111A, the heatsink of the regulator must be in close contact with the rear housing and the rear bracket to water-cool the regulator. Consequently, the alternators are subject to restrictions on the arrangement of the regulator, the brushes and the rectifier, which causes structural inconvenience and problems with assembling work.

SUMMARY OF THE INVENTION

Accordingly, it is an object of the present invention to provide a liquid-cooled alternator for vehicle intended to be installed in a high-temperature engine room, providing high degree of freedom of disposition of a regulator, and having a sufficiently high cooling ability.

According to one aspect of the present invention, an alternator for a vehicle comprises: a stator provided with a stator coil; a rotor supported for rotation in the stator to apply an alternative magnetic field to the stator; a regulator for regulating output; a rectifier for rectifying generated current; a plurality of housings holding the stator and the rotor; a coolant path for allowing a coolant to flow through at least one of the plurality of housings to transfer heat generated in the stator coil outside; and fastening devices formed of a material having good heat conductance fasten the regulator and a heatsink for the regulator together to the housing at a position apart from the housing to transfer heat generated by the regulator to the housing.

According to another aspect of the present invention, an alternator for a vehicle comprises: a stator provided with a stator coil, a rotor supported for rotation in the stator to apply an alternative magnetic field to the stator, a regulator for regulating output, a rectifier for rectifying generated current, a plurality of housings holding the stator and the rotor; a cover covering the regulator and the rectifier, and a coolant path for allowing a coolant to flow through at least one of the plurality of housings to transfer heat generated in the stator coil outside; wherein the plurality of housings and the cover are formed of metals each having good heat conductance, the rectifier is held on one of the housings, the cover and one of the housings are in metal contact, fastening devices formed of a material having good heat conductance fasten the regulator and a heatsink for the regulator together to the housing at a position between said housing and the cover to transfer heat generated by the regulator to said housing.

According to the present invention, the fastening devices formed of a material having good heat conductance fixedly fasten the regulator and the heatsink of the regulator, or the rectifier at a position spaced from the housing and the cover. Most part of heat generated by the regulator and the rectifier is transferred to the coolant flowing through the housing. Therefore, the respective temperatures of the regulator substantially entirely covered with the cover and the housing, and the rectifier are dependent mainly on the temperature of the coolant, and are not dominated by the high temperature of the ambient air and the radiant heat radiated by high-temperature parts even when the automotive alternator is exposed to a high-temperature atmosphere.

Since the regulator does not need to be set in close contact with the housing, the freedom of selecting a place for placing the regulator is increased.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

Figure 1:
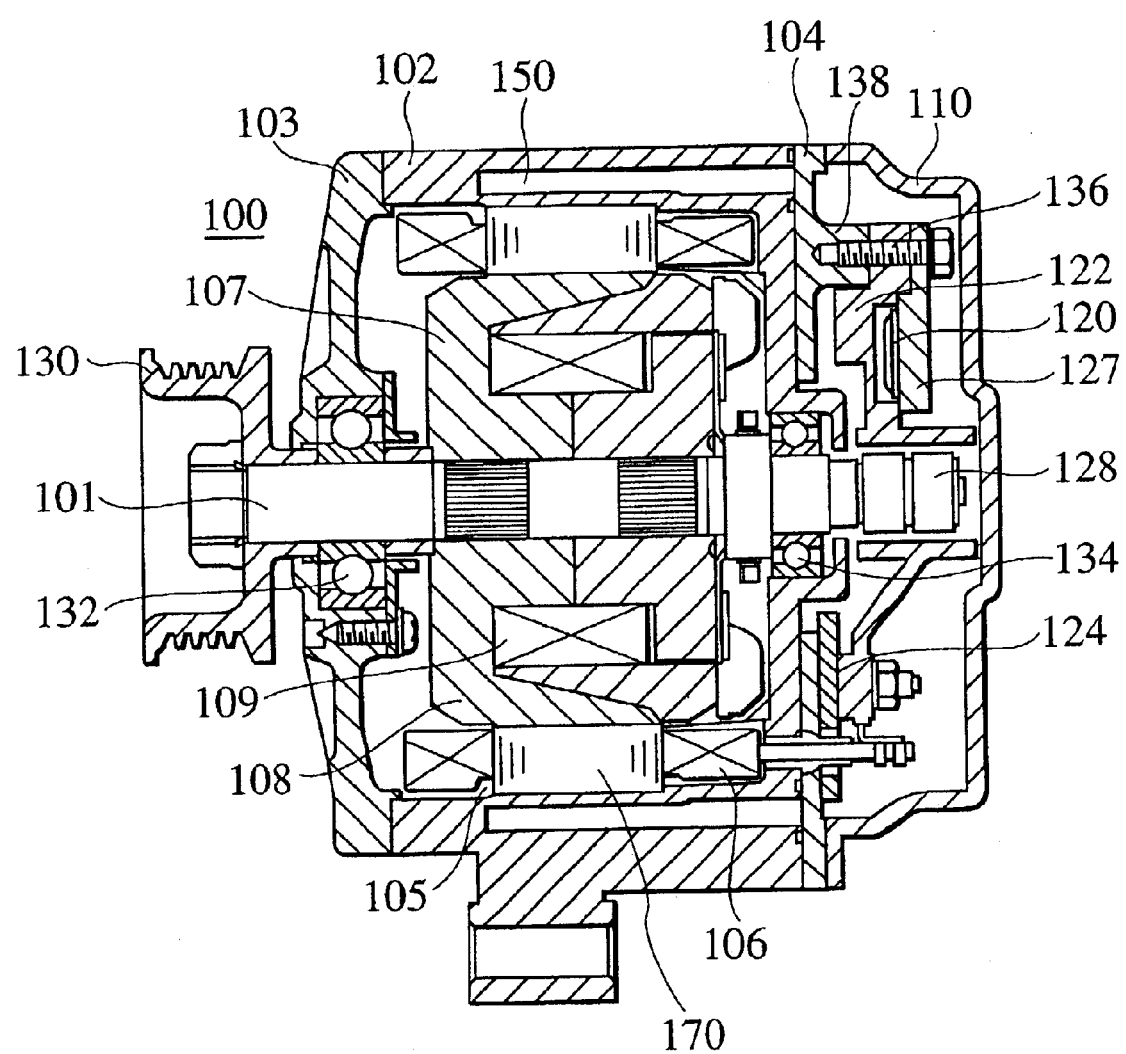
FIG. 1 is a longitudinal sectional view of a liquid-cooled automotive alternator in a first embodiment according to the present invention.
Figure 2:
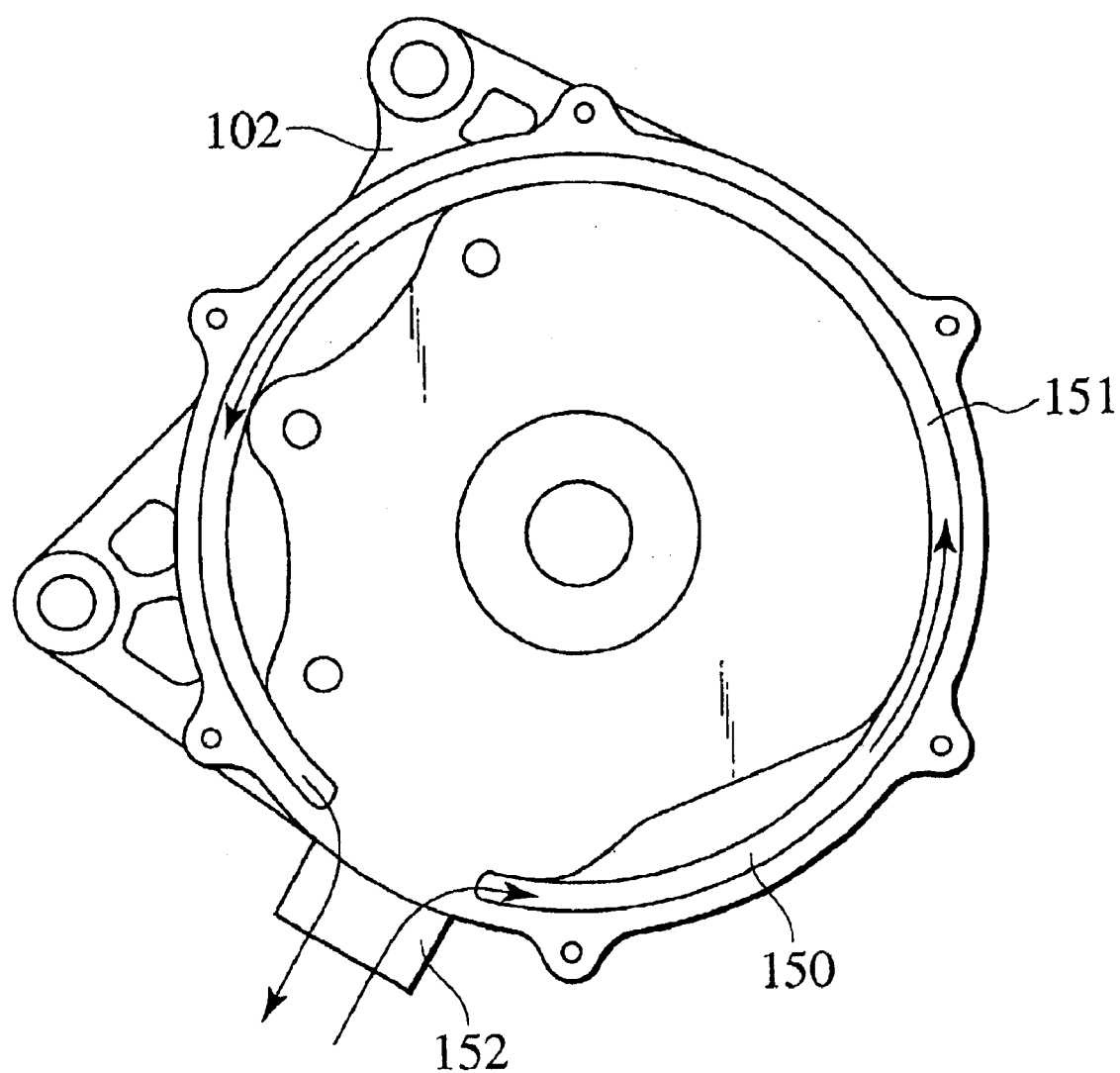
FIG. 2 is a longitudinal sectional view of the alternator shown in FIG. 1.

A liquid-cooled alternator for a vehicle in a first embodiment according to the present invention will be described with reference to FIGS. 1 to 5. FIG. 1 is a longitudinal sectional view of the liquid-cooled automotive alternator in the first embodiment, FIG. 2 is a longitudinal sectional view of the alternator shown in FIG. 1, FIG. 3 is a perspective view of a part around a regulator in a state where the rear cover is removed, FIG. 4 is a side elevation of the alternator shown in FIG. 1, in a state where a rear cover is removed, and FIG. 5 is a circuit diagram of the regulator.

An alternator 100 for a vehicle, which is also referred to as the automotive alternator, includes a center housing 102, a front housing 103 behind a pulley, a rear housing 104 on a side opposite to the side of the pulley, and a rear cover 110. The front housing 103 is formed by aluminum die cast. The front housing 103 holds a front bearing 132, and a rotor shaft 101 is supported in the front bearing 132. Similarly, the center housing 102 is formed by aluminum die cast. The center housing 102 holds a rear bearing 134, and the rotor shaft 101 is supported in the rear bearing 134. A stator 105 is held on the inner circumference of the center housing 102. A coolant path 150 through which a coolant flows is formed inside the center housing 102 and inside the rear housing 104. A pulley 130 is mounted on a front end part of the rotor shaft 101, and slip rings 128 are mounted on a rear end part of the rotor shaft 101. The pulley 130 is connected to a pulley mounted on the crankshaft of an engine by a belt. A rotor 107 is mounted on a middle part of the rotor shaft 101. A pair of wedge-shaped claw poles 108 is formed in the circumference of the rotor 107. The center housing 102 is provided with a built-in stator core 170. A small gap is defined between the inner circumference of the stator core 170 and the surfaces of the claw poles 108 of the rotor 107. Teeth and slots are arranged on the stator core 170, and stator coils 106 for three phases are embedded in the slots of the stator core 105. A field coil 109 is formed in a central part of the rotor 107. Supplying a dc current to the field coil 109 through brushes 121 and the slip rings 128 magnetizes the claw poles 108. Three-phase induced voltage is generated in the stator coils 106 when the rotor 107 is driven for rotation by the engine.

A regulator 120 for regulating the voltage of output, a brush holder 122 and a rectifier 124 for rectifying generated current are fastened to the rear housing 104 and are covered with the rear cover 110. The regulator 120 includes a chip and the like formed on a thin substrate. A heatsink 127 having the shape of a flat plate is disposed so as to be in surface contact with the back surface of the substrate.

Figure 3:
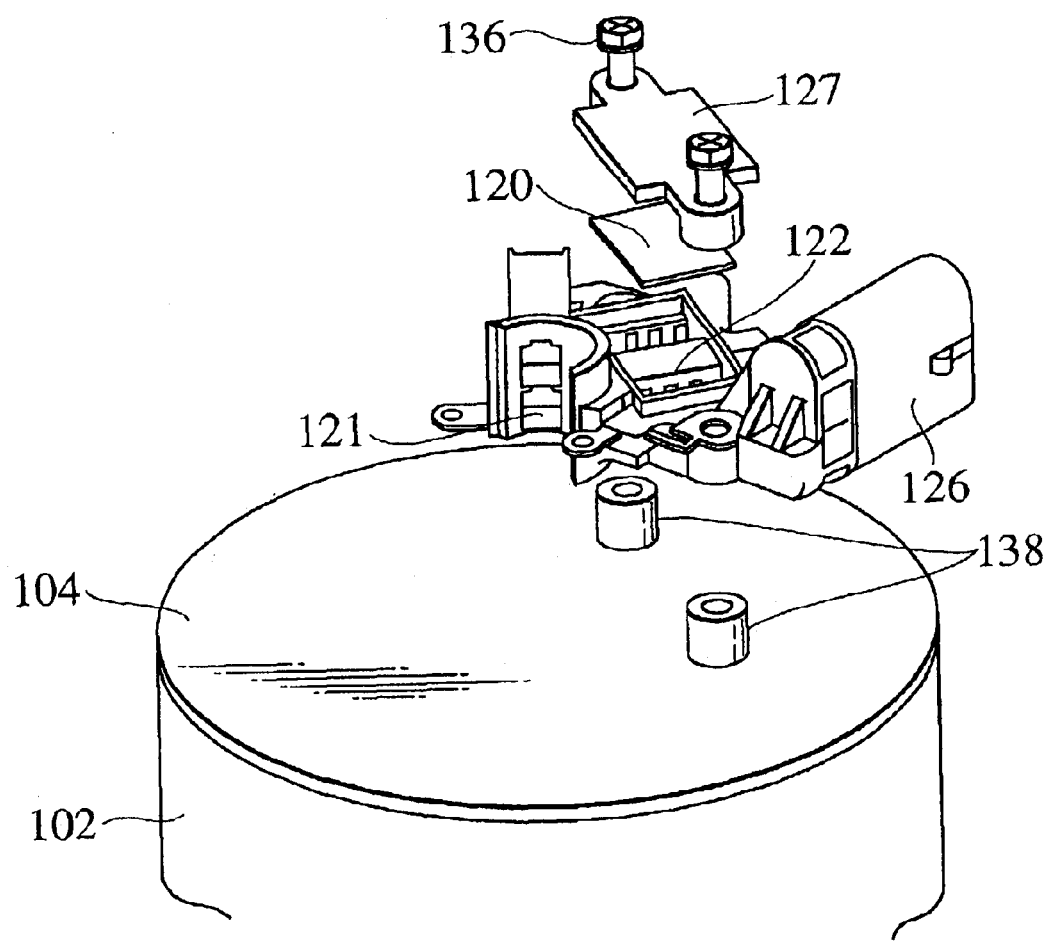
FIG. 3 is a perspective view of a part around a regulator of the alternator shown in FIG. 1, in which the rear cover is removed.
Figure 4:
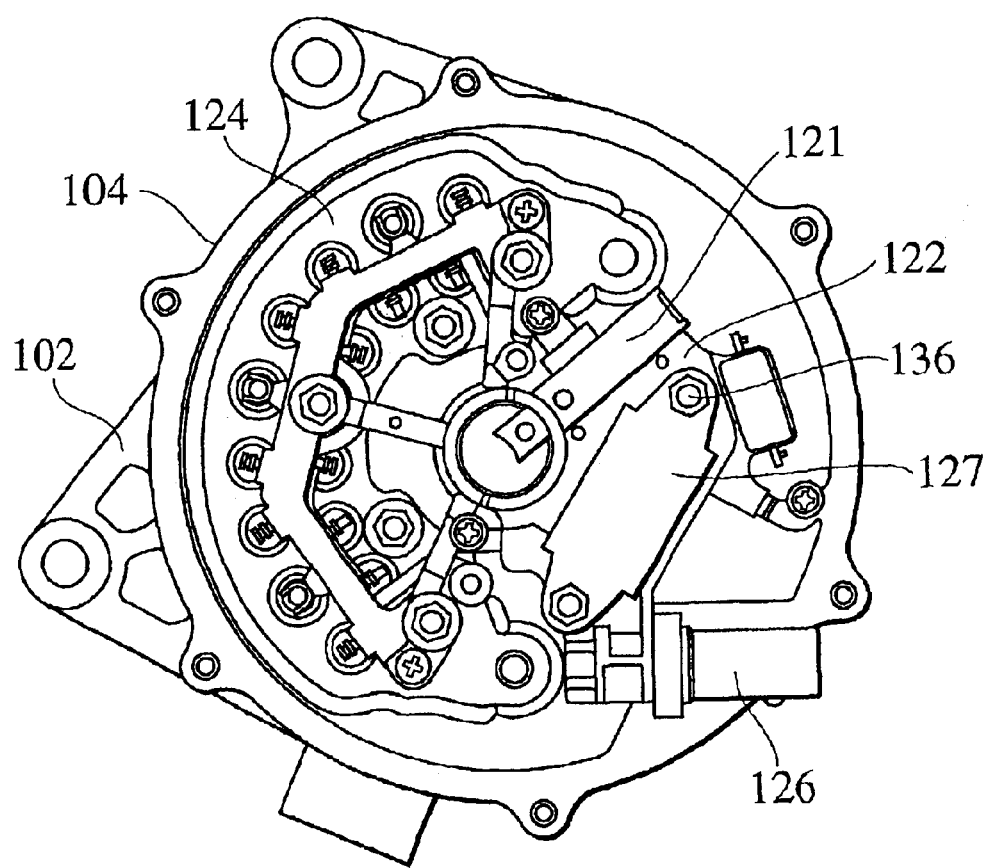
FIG. 4 is a side elevation of the alternator shown in FIG. 1, in which a rear cover is removed.
Figure 5:
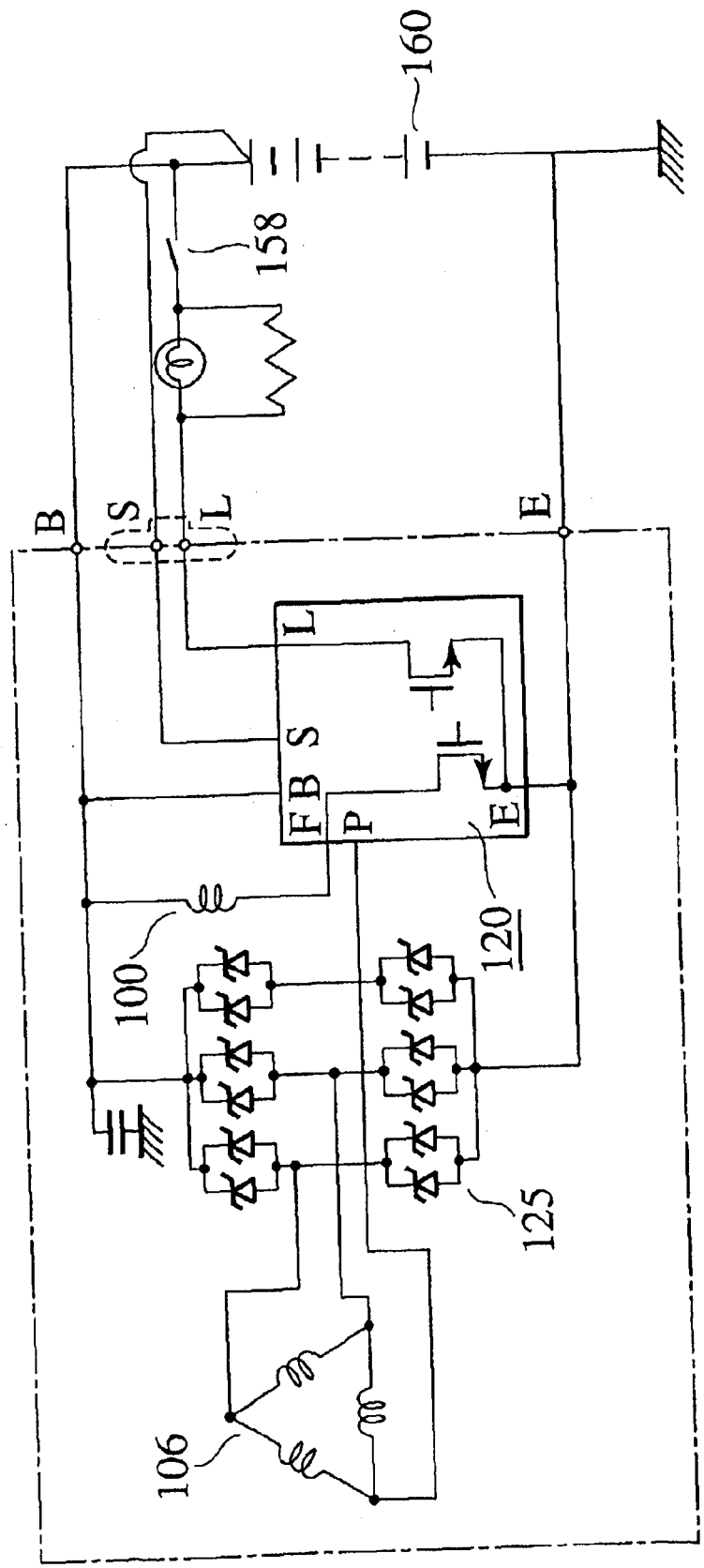
FIG. 5 is a circuit diagram of a regulator shown in FIG. 1.

Referring to FIGS. 3 and 4, the regulator 120 and the heatsink 127 are held by a holder 122 formed integrally with the brushes 121 and a connector 126 for connection with the vehicle side. The regulator 120 and the heatsink 127 are fastened to the rear housing or the center housing with fastening devices 136. The rear housing 104 is provided with mounting projections 138 provided with an internal thread. Mounting bosses formed on the heatsink 127 are set on the mounting projections 138 and the heatsink 127 is fastened t the rear housing 104 with long bolts 136 serving as the fastening devices. Thus, the heatsink 127 of the regulator 120 is spaced from the rear housing 104 by a distance corresponding to the sum of the respective heights of the mounting projections 138 and the bosses of the heatsink 127. Also, the heatsink 127 is spaced from the rear cover 110. Heat is transferred from the heatsink 127 of the regulator 120 through the fastening devices 136 to the rear housing 104.

Desirably, the fastening devices 136 are formed of iron or brass having a heat conductivity $\lambda$ of 30 W/m·K or above. The rear housing 104 and the rear cover 110 are formed of aluminum, i.e., a material having good heat conductance, by die cast.

The rear housing 104 and the rear cover 110 may be formed of aluminum plates by press molding instead of by aluminum die cast.

The regulator 120 and the heatsink 127 may be fixedly held in place by any suitable holding means instead of by the combination of the long bolts and the mounting projections, provided that the holding means is capable of holding the regulator 120 and the heatsink 127 apart from the rear housing 104 and the rear cover 110 and of efficiently transmitting heat generated by the regulator 120 to the rear housing.

The regulator 120, the rectifier 124 for rectifying generated current, and the brushes 121 for supplying a field current to the rotor are arranged substantially in the same plane.

The center housing 102 holds the rear bearing 134, on a side opposite to the pulley, on the inner side of the rear cover 110 covering the regulator 120, the rectifier 124 and the brushes 121.

In the first embodiment, heat generated by the regulator 120 flows to the heatsink 127 and is dissipated through the fastening devices 136 into the coolant flowing through the coolant path 150. Since heat is dissipated through the fastening devices 136, heat can be efficiently transferred from the regulator 120 to the rear housing 104 even if the holder 122 formed of a resin is held between the heatsink 127 and the rear housing 104.

In this liquid-cooled alternator, the coolant path 150 formed in the alternator to allow the coolant to flow through the alternator has a cyclic channel 151 (see FIG. 2) axially extending in the center housing. One of the opposite ends or both the opposite ends of the cyclic channel 151 are open, and the open end or the open ends are covered with the rear housing 104 to form a closed water path. In the first embodiment, only the rear end of the coolant path is open. The coolant path 150 communicates with an outlet and inlet coolant pipe 152 formed in the side wall of the center housing 102.

The heatsink of the regulator 120 for controlling the voltage of output is fastened to the rear housing 104 forming part of the coolant path 150 by the fastening devices 136, heat generated by the regulator 120 is transferred through the fastening devices 137 to the rear housing 104 and is dissipated into the coolant. The coolant path 150 communicates with an engine coolant circulation system by means of the outlet and inlet coolant pipe 152 formed in the side wall of the center housing 102. A radiator, a thermostat and a pump are connected to the engine coolant circulation system. Heat generated by the alternator is absorbed by the coolant flowing through the engine coolant circulation system and is dissipated through the radiator by heat exchange.

Referring to FIGS. 3 and 4, the regulator 120 is held by a regulator holder 122 formed integrally with the brushes 121 and the connector 126 for connection with the vehicle side. The regulator 120, the rectifier 124 for rectifying generated current and the brushes 121 for supplying current to the rotor are disposed substantially at the same axial position, i.e., substantially in the same plane. A rectification circuit includes diodes 125. The brush holder is held fixedly between the heatsink 127 of the regulator 120, and the rear housing 104.

Referring to FIG. 5, the regulator 120 regulates the field current to maintain the voltage of the dc current produced by rectifying an alternating current by the rectifier 124 at a fixed voltage on the order of 14.3 V to charge a battery. The positive diode fins are connected to the positive terminal of the battery. The potential of negative diode fins are equal to that of the alternator 100. The negative diode fins are connected electrically to the negative terminal of the battery. The rectifier including the diodes is a full-wave rectifier capable of rectifying the voltage of an alternate current induced in the stator coils 106 into a dc voltage.

In this embodiment, when the rotor 107 creating a magnetic field rotates, a current produced in the stator coils 106 flows in the stator 105 of the alternator and the thus produced current is rectified by the rectifier 124 to provide a direct current. The regulator 120 regulates the field current supplied to the rotor 107 to create a magnetic field.

The outer circumference of the stator 105 is in contact with the center housing 102. The center housing 102 is formed of a material having good heat conductance, a heat conductivity of 80 W/m·K or above, such as aluminum, by die cast. The coolant flows through the coolant path 150 formed in the wall of the center housing 102. Accordingly, most part of heat generated by the stator coil 106 can be dissipated into the coolant.

Although the regulator 120 generates heat at a comparatively low rate and hence the amount of heat to be dissipated is small, the regulator 120 has a comparatively low heat resistance and hence the temperature of the atmosphere affects the regulator 120 significantly. The present invention covers the regulator 120 and the rectifier 124 with the cover 110 formed of a material having good heat conductance of 80 W/m·K or above, such as aluminum, by die cast. The cover 110 has a peripheral part attached to the rear housing 104 formed of a material having good heat conductance, a heat conductivity of 80 W/m·K or above, such as aluminum, by die casting and fixed to the center housing 102. The regulator 120 is in thermal contact with the heatsink 127 fixed to the rear housing 104 and formed of a material having good heat conductance, a heat conductivity of 80 W/m·K or above. Thus, heat generated by the regulator 120 can be transferred to the center housing 102 and can be dissipated into the coolant.

According to the present invention, the housings 102, 103 and 104 holding the stator 105 and the rotor 107 are formed of metals having good heat conductance, a heat conductivity of 80 W/m·K or above. Most part of heat generated by the stator coils 106 is transferred to the coolant flowing through the housings.

The rear cover 110 covering the regulator 120, the regulator holder 122 and the rectifier 124 is formed of a metal having good heat conductance, a heat conductivity of 80 W/m·K or above. Most part of the peripheral part of the rear cover 110 is in metal contact with the housing.

Most part of heat generated by the regulator 120 is transferred through the fastening devices 136 to the coolant flowing through the housings (102, 103, 104). Therefore, the respective temperatures of the regulator 120 substantially entirely covered with the rear cover 110 and the housings (102, 103, 104), and the rectifier 124 are dependent mainly on the temperature of the coolant.

Thus, the respective temperatures of the regulator 120 and the rectifier 124 are not dominated by the high temperature of the ambient air and the radiant heat radiated by high-temperature parts even when the automotive alternator is exposed to a high-temperature atmosphere.

As mentioned above, the alternator, in which the heatsink of the regulator is in close contact with the housing provided with the coolant path, is subject to restrictions on the arrangement of the regulator, the brushes and the rectifier, which sometimes causes structural inconvenience and problems with assembling work. According to the present invention, the heat generated by the regulator is transferred through the fastening devices 136. Therefore, the regulator 120 does not need to be held in close contact with the housing and hence the freedom of placing the regulator, the brushes and the rectifier is improved.

Figure 6:
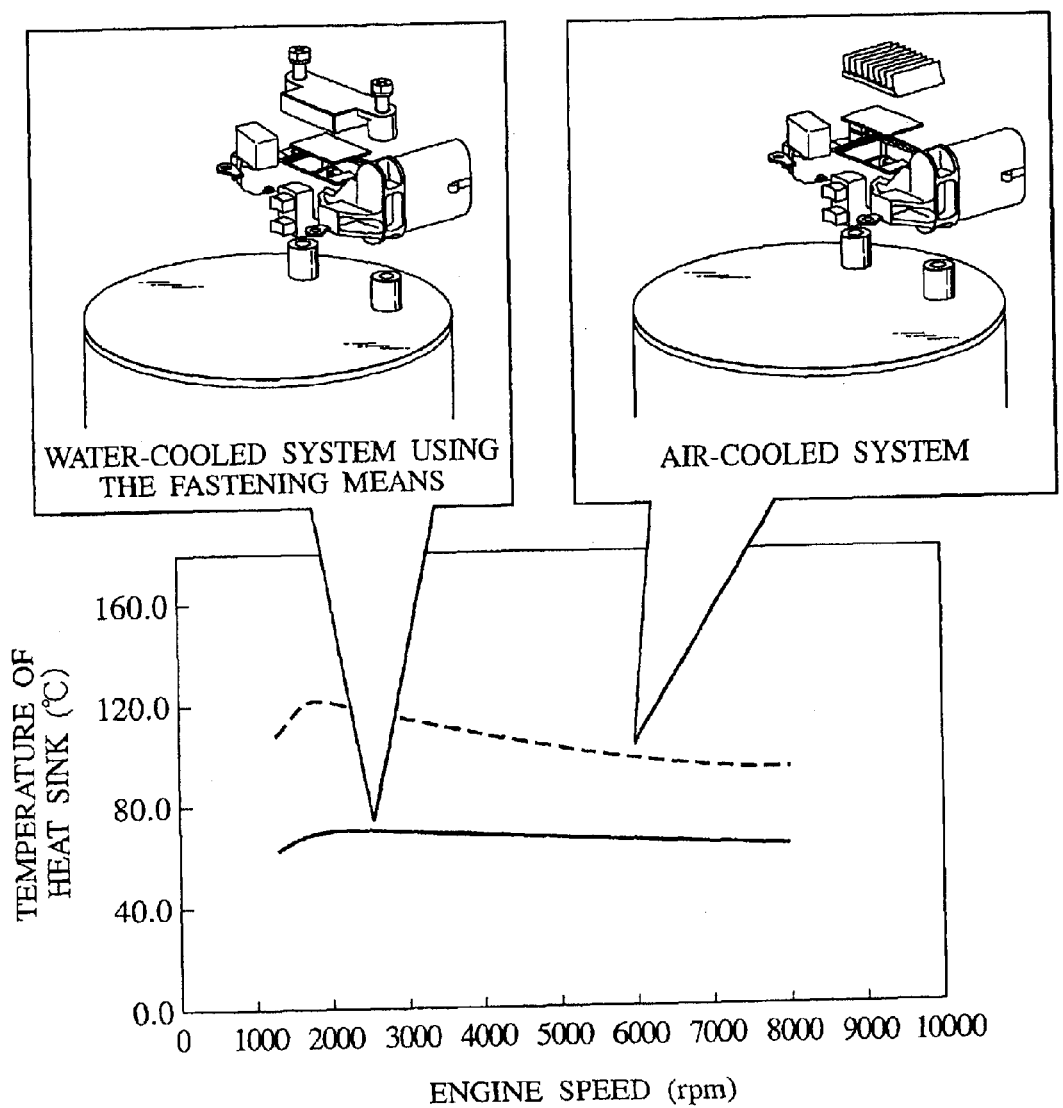
FIG. 6 is a graph showing results of experiments conducted to examine cooling ability.

FIG. 6 is a graph showing the results of experiments performed to examine the respective cooling abilities of an air-cooled system that cools the regulator by air and a water-cooled system that cools the regulator through the fastening devices by water. Temperature difference between a heatsink cooled by the air-cooled system and a heatsink cooled by the water-cooled system is known from FIG. 6. Experiments for the air-cooled system used a holder that can be used also in an air-cooled alternator of a regulator. The temperature difference known from the graph represents the effect of cooling using the fastening devices 136. The regulator case cooled by the water-cooled system using the fastening devices of the present invention was kept at temperatures not higher than 70° C. The regulator case cooled by the air-cooled system was heated at high temperatures in the range of 90 to 120° C. As obvious from FIG. 6, the regulator can be cooled with reliability by the water-cooled system using the fastening devices, and the water-cooled system improves the freedom of placement.

The automotive alternator 100 may be provided with only the front housing 103, the rear housing 104 and the rear cover 110, and the center housing may be omitted. The regulator 120 is held on the rear housing 104. In this case, the coolant path through which the coolant flows is provided in the walls of the front housing 103 and the rear housing 104. Omission of the center housing reduces the number of parts.

Figure 7:
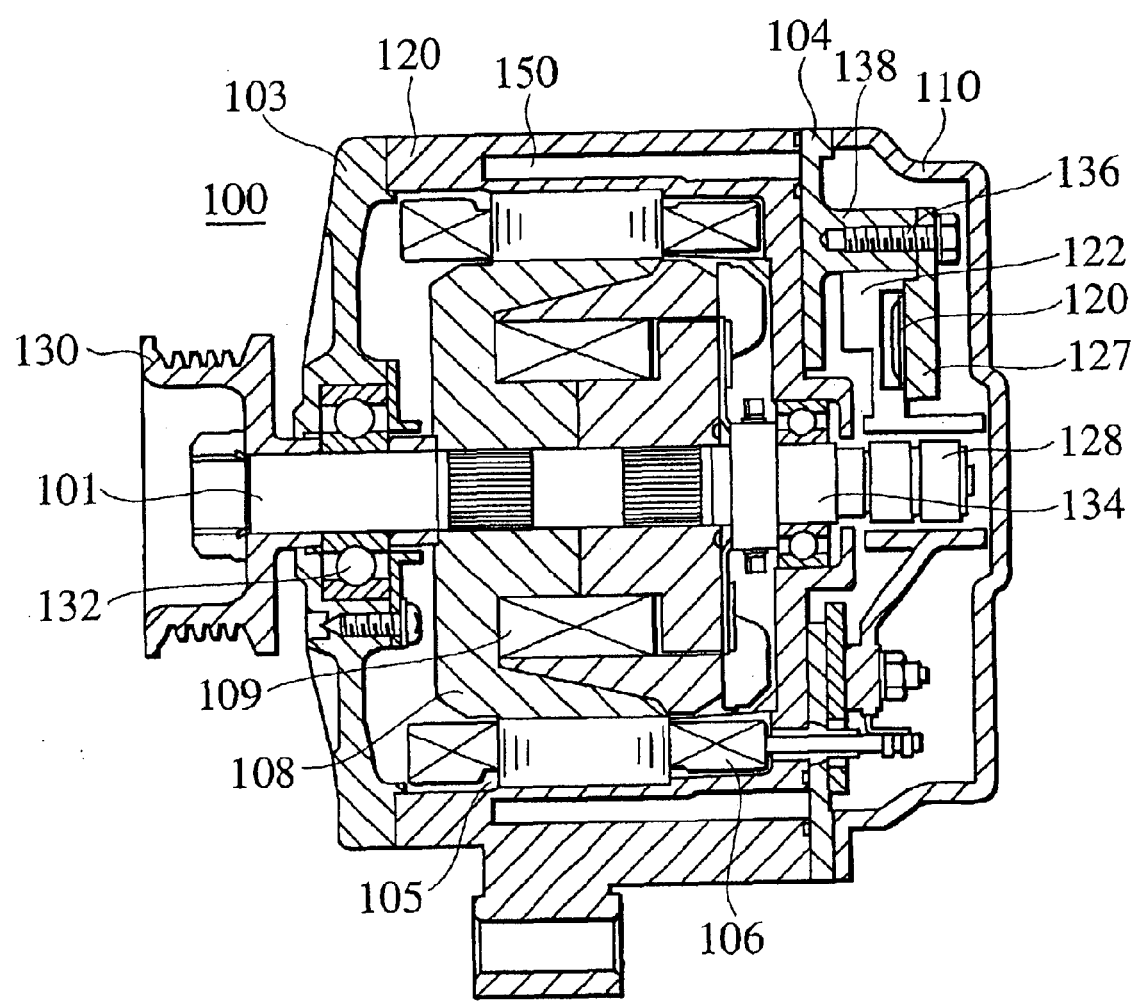
FIG. 7 is a longitudinal sectional view of a liquid-cooled automotive alternator in a second embodiment according to the present invention.

FIG. 7 is a longitudinal sectional view of a liquid-cooled automotive alternator in a second embodiment according to the present invention. A holder formed integrally with brushes 121 and a connector 126 for connection with the vehicle side holds a regulator 120. A heatsink 127 included in the regulator 120 is fastened to a rear housing 104 by fastening devices 136. The regulator 120, a rectifier 124 and the brushes 121 are disposed substantially in the same plane.

Although the heatsink 127 is fastened directly to the rear housing 104 by the fastening devices 136 without holding the holder between the heatsink 127 and the rear housing 104 in the second embodiment, the effect of the second embodiment is similar to that of the first embodiment.

Figure 8:
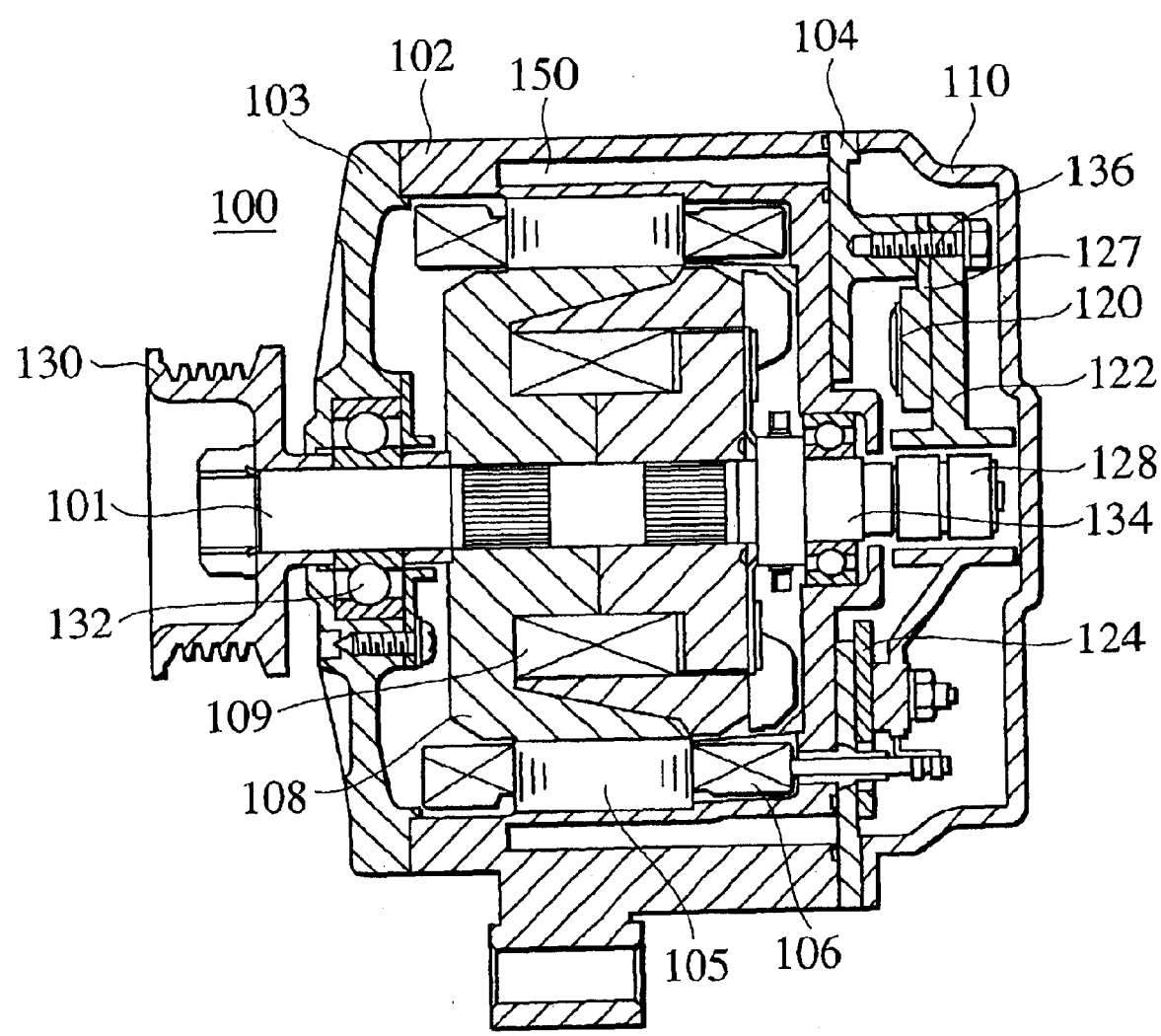
FIG. 8 is a longitudinal sectional view of a liquid-cooled automotive alternator in a third embodiment according to the present invention.
Figure 9:
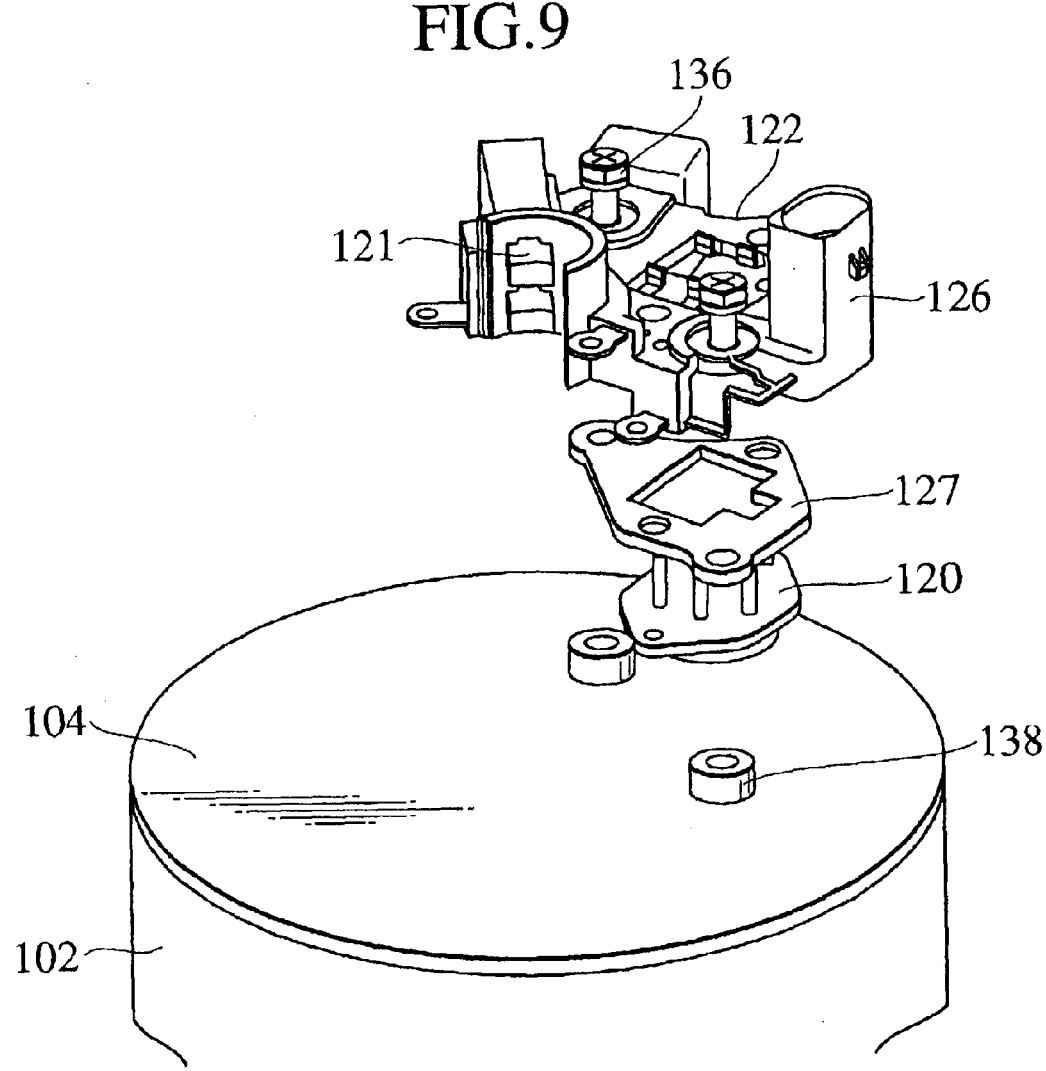
FIG. 9 is a perspective view of a part around a regulator of the alternator shown in FIG. 8, in which a rear cover is removed.

FIG. 8 is a longitudinal sectional view of a liquid-cooled automotive alternator in a third embodiment according to the present invention, and FIG. 9 is a perspective view of a part around a regulator of the automotive alternator shown in FIG. 8, in which a rear cover is removed. In the third embodiment, a regulator 120 is disposed between a holder 122 and a rear housing 104, and a heatsink 127 included in the regulator 120 is fastened to a rear housing 104 by fastening devices 136. The effect of the third embodiment is similar to those of the foregoing embodiments.

Figure 10:
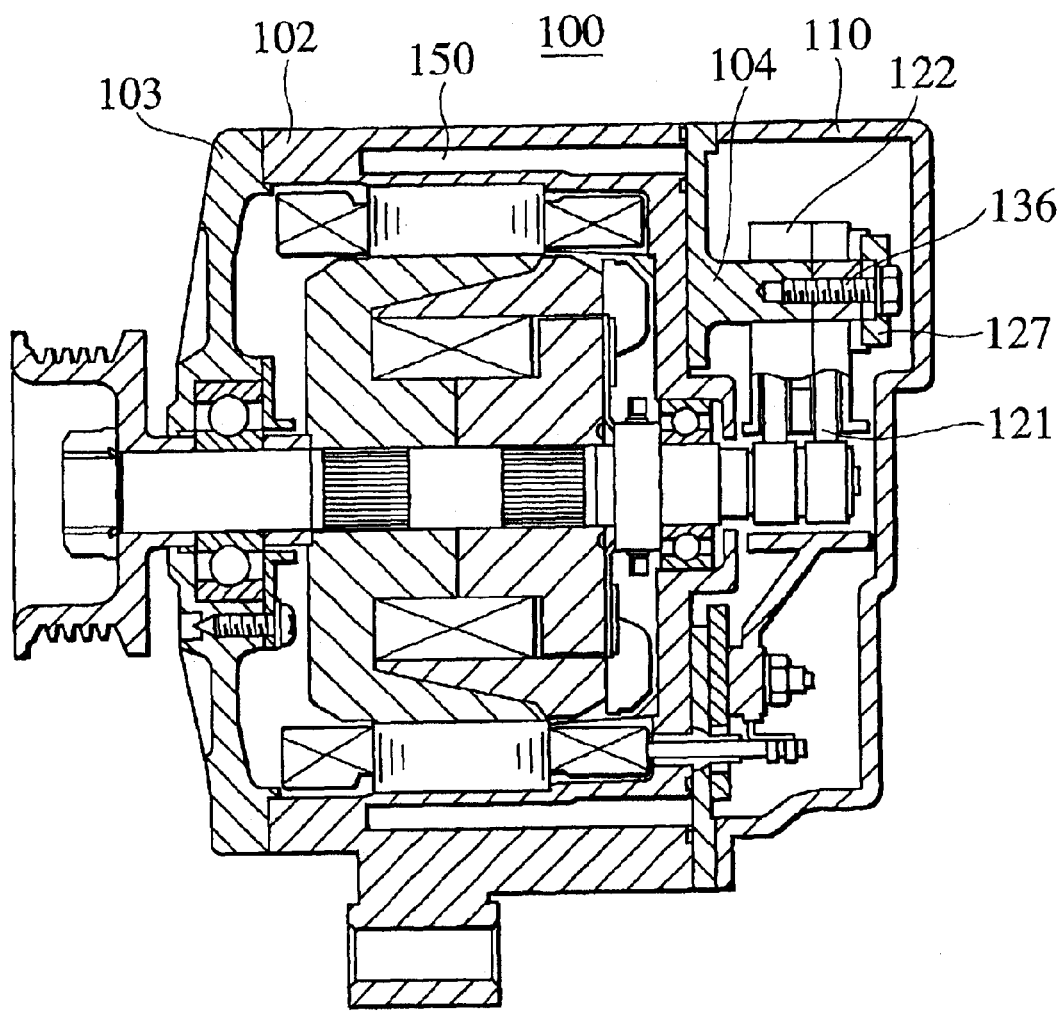
FIG. 10 is a longitudinal sectional view of a liquid-cooled automotive alternator in a fourth embodiment according to the present invention.
Figure 11:
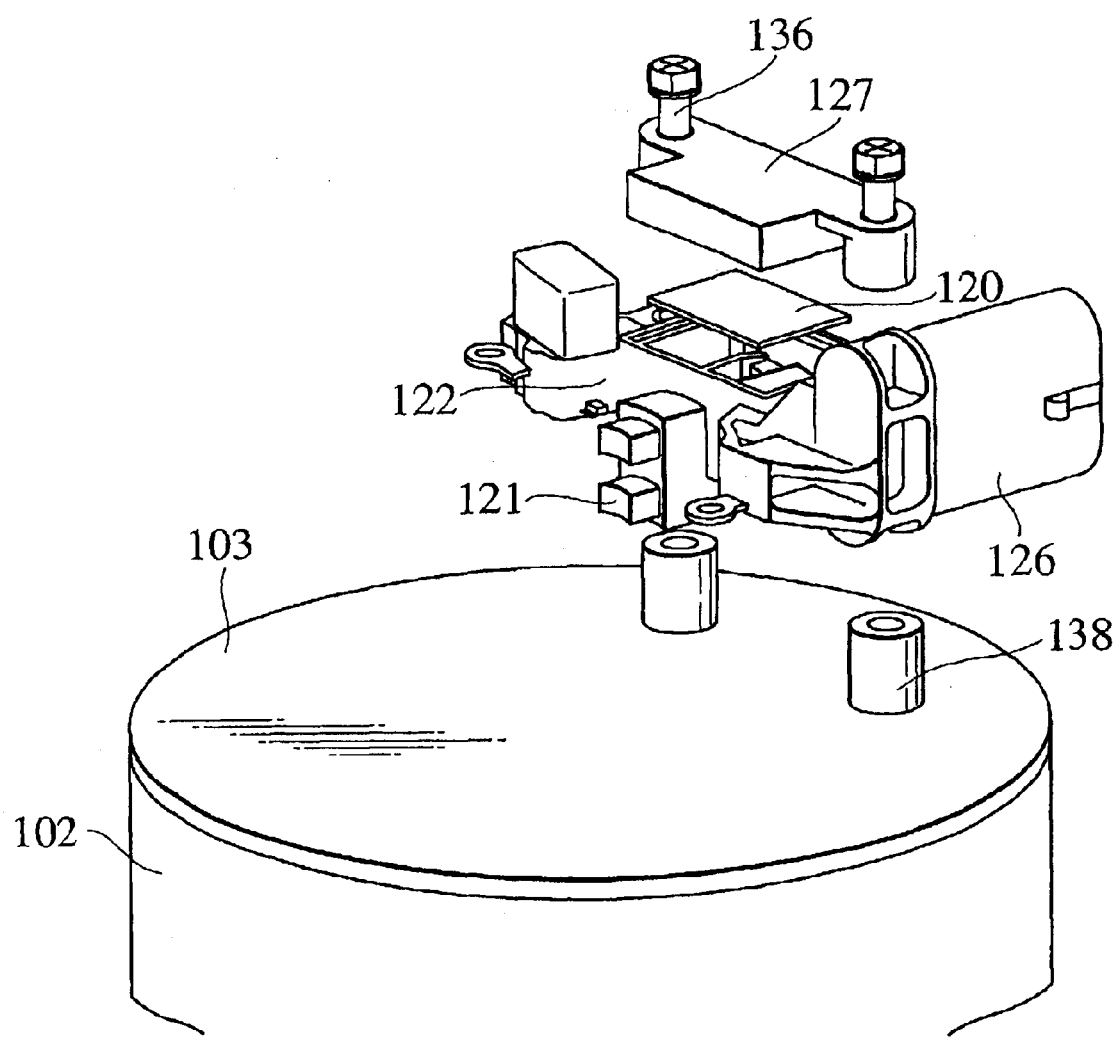
FIG. 11 is a perspective view of a part around a regulator of the alternator shown in FIG. 10, in which a rear cover is removed.

FIG. 10 is a longitudinal sectional view of a liquid-cooled automotive alternator in a fourth embodiment according to the present invention, and FIG. 11 is a perspective view of a part around a regulator of the automotive alternator shown in FIG. 10, in which a rear cover is removed. An automotive alternator 100 in the fourth embodiment has a front housing 103, a rear housing 104 and a rear cover 110. A regulator holder 122 formed integrally with brushes 121 and a connector 126 for connection with the vehicle side holds a regulator 120. The regulator 120 and the brushes 121 are arranged in the axial direction of the alternator with the regulator 120 disposed at the outermost axial end. A heatsink 127 and fastening devices 136 are formed of materials respectively having good heat conductance. Heat generated by the regulator 120 is efficiently transferred to the center housing 102 and is dissipated by a coolant.

The axial arrangement of the brushes 121 and the regulator 120 reduces the circumferential area of the holder 122 holding the regulator 120 to improve the freedom of placement of other parts in the rear cover 110.

Figure 12:
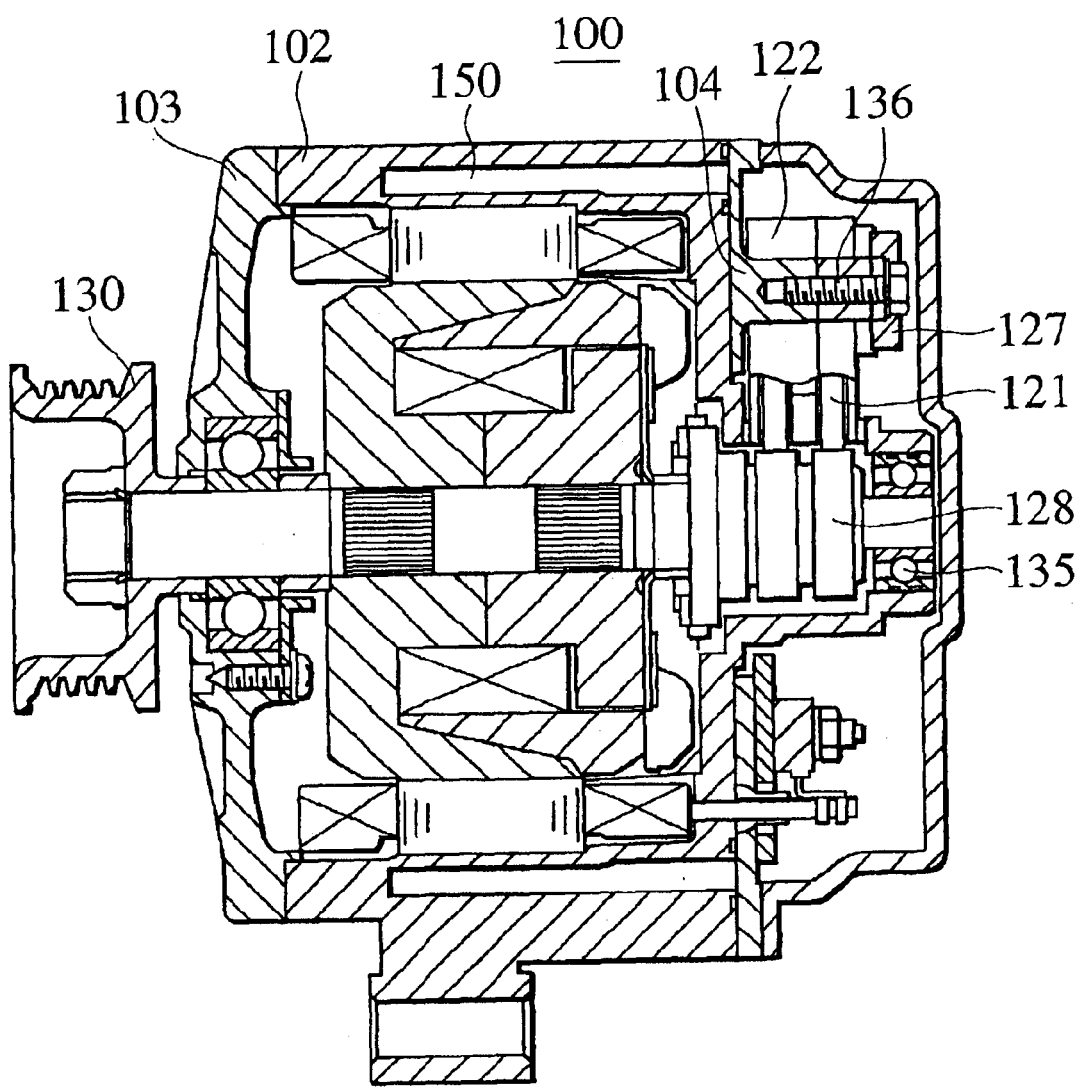
FIG. 12 is a longitudinal sectional view of a liquid-cooled automotive alternator in a fifth embodiment according to the present invention.

FIG. 12 is a longitudinal sectional view of a liquid-cooled automotive alternator in a fifth embodiment according to the present invention. The fifth embodiment differs from the foregoing embodiments in that slip rings 128 of a rotor are disposed on the inner side of a rear bearing 135 on a side opposite to the side of a pulley. In other words, this arrangement of the slip rings 128 enables disposing a regulator 120 and a rectifier closer to a center housing 102, so that heat generated by the regulator 120 and the rectifier 124 can be effectively transferred to the center housing 102 for cooling.

According to the present invention, the regulator and the heatsink for the regulator are fixed at a position apart from the housing and the cover by the fastening devices formed of a material having good heat conductance. Most part of the heat generated by the regulator is transferred to the coolant flowing through the housing. Therefore, the temperature of the regulator entirely covered with the cover and the housing is dependent mainly on the temperature of the coolant. Therefore, even when the automotive alternator is exposed to a high-temperature atmosphere for a long time, the temperatures of the regulator is not dominated by the ambient temperature and radiant heat radiated by the adjacent high-temperature parts. Thus, the automotive alternator has a stable cooling effect.

Since the regulator does not need to be set in close contact with the housing, the freedom of placement of the regulator is improved.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An alternator for a vehicle, comprising:

a stator provided with a stator coil;

a rotor supported for rotation in the stator to apply an alternative magnetic field to the stator;

a regulator for regulating output;

a rectifier for rectifying generated current;

a plurality of housings holding the stator and the rotor; and a coolant path for allowing a coolant to flow through at least one of the plurality of housings to transfer heat generated in the stator coil outside the alternator;

wherein fastening devices formed of a material having good heat conductance fasten the regulator and a heatsink for the regulator together to the housing at a position apart from the housing to transfer heat generated by the regulator to the housing.

2. The alternator for a vehicle according to claim 1, wherein the regulator, and brushes for supplying a field current to the rectifier and the rotor are disposed in substantially the same plane with respect to a direction along the axis of the rotor.

3. The alternator for a vehicle according to claim 2, wherein the heatsink of the regulator and brush holders holding the brushes are disposed in an axial arrangement with the regulator disposed on the side of the rear housing and fixed to the rear housing.

4. The alternator for a vehicle according to claim 1, wherein the plurality of housings include a center housing, a front housing disposed on the side of a pulley, and a rear housing disposed on a side opposite to the side of the pulley, the coolant path is provided at least in the center housing and the rear housing, the center housing holds a bearing on the side opposite to the side of the pulley, and the fastening devices fasten the regulator and the heatsink for the regulator together to said one of the plurality of housings at a position between said one of the plurality of housings and the cover.

5. The alternator for a vehicle according to claim 4, wherein the fastening devices fasten the heatsink directly to the rear housing.

6. The alternator for a vehicle according to claim 1, wherein the fastening devices include bolts, and the bolts fasten support parts respectively provided with threaded holes and formed on an end surface of said one of the plurality of housings to mounting bosses formed on the heatsink.

7. An alternator for a vehicle comprising:

a stator provided with a stator coil;

a rotor supported for rotation in the stator to apply an alternative magnetic field to the stator;

a regulator for regulating output;

a rectifier for rectifying generated current;

a plurality of housings holding the stator and the rotor;

a cover covering the regulator and the rectifier; and a coolant path for allowing a coolant to flow through at least one of the plurality of housings to transfer heat generated in the stator coil outside the automotive alternator;

wherein the plurality of housings and the cover are formed of metals each having good heat conductance, the rectifier is held on said one of the plurality of housings, the cover and one of the housings are in metal contact, and fastening devices formed of a material having good heat conductance fasten the regulator and a heatsink for the regulator together to said one of the plurality of housings at a position between said one of the plurality of housings and the cover to transfer heat generated by the regulator to said one of the plurality of housings.

8. The alternator for a vehicle according to claim 7, wherein the regulator, and brushes for supplying a field current to the rectifier and the rotor are disposed in substantially the same plane with respect to a direction along the axis of the rotor.

9. The alternator for a vehicle according to claim 8, wherein the heatsink of the regulator and brush holders holding the brushes are disposed in an axial arrangement with the regulator disposed on the side of the rear housing and fixed to the rear housing.

10. The alternator for a vehicle according to claim 7, wherein the plurality of housings include a center housing, a front housing disposed on the side of a pulley, and a rear housing disposed on a side opposite to the side of the pulley, the coolant path is provided at least in the center housing and the rear housing, the center housing holds a bearing on the side opposite to the side of the pulley, and the fastening devices fasten the regulator and the heatsink for the regulator together to said one of the plurality of housings at a position between said one of the plurality of housings and the cover.

11. The alternator for a vehicle according to claim 10, wherein the fastening devices fasten the heatsink directly to the rear housing.

12. The alternator for a vehicle according to claim 7, wherein the fastening devices include bolts, and the bolts fasten support parts respectively provided with threaded holes and formed on an end surface of said one of the plurality of housings to mounting bosses formed on the heatsink.

* * * * *